(12) United States Patent
Lynch-Aird

(10) Patent No.: US 6,240,402 B1
(45) Date of Patent: May 29, 2001

(54) CHARGE ALLOCATION IN A MULTI-USER NETWORK

(75) Inventor: Nicolas James Lynch-Aird, Stowmarket (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,900

(22) PCT Filed: Mar. 26, 1997

(86) PCT No.: PCT/GB97/00842

§ 371 Date: Mar. 11, 1998

§ 102(e) Date: Mar. 11, 1998

(87) PCT Pub. No.: WO97/37462

PCT Pub. Date: Oct. 9, 1997

(30) Foreign Application Priority Data

Mar. 29, 1996 (GB) .................................................. 9606622
Jan. 9, 1997 (GB) .................................................. 9700365

(51) Int. Cl.[7] .................................................. G06F 17/60
(52) U.S. Cl. .................................................. 705/400; 379/114
(58) Field of Search .................................... 379/111, 114; 705/1, 30, 34, 52, 53, 59, 400, 418

(56) References Cited

U.S. PATENT DOCUMENTS

| 4,868,758 | * | 9/1989 | Kokubu | 705/400 |
| 5,265,155 | * | 11/1993 | Castro | 379/112 |
| 5,406,555 | | 4/1995 | Yoshida | 370/60 |
| 5,440,621 | * | 8/1995 | Castro | 379/112 |
| 5,745,884 | * | 4/1998 | Carnegie et al. | 705/34 |
| 5,774,535 | * | 6/1998 | Castro | 379/144 |
| 5,787,151 | * | 7/1998 | Natatsu et al. | 379/88.23 |

FOREIGN PATENT DOCUMENTS

| 639 013 | | 2/1995 | (EP) . |
| 63-290042 | * | 11/1988 | (JP) . |
| 5-244166 | * | 9/1993 | (JP) . |
| 6-104922 | | 4/1994 | (JP) . |
| 7-154387 | | 6/1995 | (JP) . |
| 11-119937 | * | 4/1999 | (JP) . |

OTHER PUBLICATIONS

Vardy: "Protus to provide fax access over Net: 'Product with potential': People in major Canadian cities can get faxes in e-mail"; Financial Post, Nov. 29, 1999, p. 5.*

* cited by examiner

Primary Examiner—Edward R. Cosimano
(74) Attorney, Agent, or Firm—Nixon & Vanderhye P.C.

(57) ABSTRACT

A communication network includes a communication monitoring point arranged to monitor user identifiers in source/destination identifier fields to determine a charging scheme.

20 Claims, 5 Drawing Sheets

| RECIPIENT IDENTIFIER | CHARGE SCHEME | ALLOCATED TO: |
|---|---|---|
| $RID_1$ | CHARGE CALL ORIGINATOR | $R_A$ |
| $RID_2$ | CHARGE $R_A$ | $R_A$ |
| $RID_3$ | CHARGE CALL ORIGINATOR PAY $R_A$ | $R_A$ |
| $RID_4$ | CHARGE CALL ORIGINATOR 50% CHARGE $R_A$ 50% | $R_A$ |
| ○○ | ○○ | ○○ |
| $RID_N$ | CHARGE CALL ORIGINATOR | $R_M$ |
| ○○○ | ○○○ | ○○○ |

CHARGE ALLOCATION IN A MULTI-USER NETWORK

BACKGROUND OF THE INVENTION

The present invention relates to a communication network and in particular to charge allocation in multi-user networks in which access to the network is not controlled by the network provider.

With the advent of multi-user computer networks, whereby users can communicate with one another via user access points such as terminals included in the network across a communication medium such as telephone lines, the problem of how the users may be charged by the network provider for using a network has arisen.

When a particular network is used by a single customer only (e.g. private circuits), then the network provider can determine the total cost of providing that network and use this information to set the charges for the customer. However, where a network is used by more than one customer, the network provider must apportion the network charges in some way.

Where the network has some means of controlling customer access (access control) to the network then this same mechanism can also be used to monitor, and hence charge for, customers' usage of the network. A network incorporating access control means is shown schematically in FIG. 1. Users access the network designated generally as 1 via one of a plurality of terminals 2 all of which are connected to the network backbone 3. Each terminal 2 accesses the network backbone 3 via a respective access control 4. In the example shown the access control 4 is terminal-specific and can be arranged to record charging data such as call length, call type and/or call duration and ensure that the charge is attributed to the associated terminal 2.

For many network types, however, the network provider does not have a means of controlling customer access such as that described above. Whilst the network provider in such cases could place an access control mechanism such as a usage monitor at each point of connection into the network, the provision, security, maintenance, and monitoring (to collect charge records) of such usage monitors would give rise to considerable expense and operational difficulties.

In fact such arrangements will gave rise to considerable problems. This is a particularly significant point when it is recognized that many of the network types which do not provide an access control mechanism are the most commonly used network types such as:

Local, wide and metropolitan area networks (LANs, WANs & MANs) e.g. office ethernet LANs.

The ether, for example user to user direct radio communication.

The proposed optical ether.

One solution is for network providers to charge their customers some form of subscription. Charging by subscription, though, may discourage potential customers who only expect to make limited use of the network and who would therefore effectively end up subsidising customers who are high network users.

Alternatively, where the network is provided as part of a package together with one or more value-added services, the service provider may incorporate the network costs into the value-added service charges to the end customers. In this case, however, the network is effectively being supplied to the service provider by an internal network provider; with the service provider paying the entire network cost. This is then a single-user rather than multi-user scenario.

One of the essential characteristics of a broadcast network such as the examples listed earlier, is that the network traffic must traverse every potential access point in the network. Thus the entirety of the network traffic may be monitored at a single point, or, optionally in the case of dispersive media such as the ether (air) at a number of points throughout the network domain. In either case the number of monitoring points can be small in number compared to the number of customers using the network and the monitoring points can be removed from the customers' points of entry into the network. Such a system is shown in FIG. 2. Once again network 1 includes a plurality of terminals 2 and a network backbone 3. In this case, however, there are no access controls 4 but instead a single monitoring point 5 is provided on the network backbone 3 through which all traffic passes.

U.S. Pat. No. 5,406,555 assigned to NEC Corporation relates to a local area network in which a charging apparatus is used in the local area network (LAN) or in bridge apparatus interconnecting the LANs. Packets passing though the charging apparatus include source and destination addresses, and packet counts are accumulated against the various combinations of source and destination addresses. Usage charges can be raised accordingly.

A problem associated with that system is that, in many cases, a call initiated by one customer to another may result in traffic flows back and forth between both parties for the duration of their interaction. Under the scheme described in U.S. Pat. No. 5,406,555 there is no means of determining how the individual packets comprising such interactive calls should be charged. For example a packet with customer A as the source and customer B as the destination could be part of an interaction sequence chargeable to A or B; there is no way to tell.

A solution proposed in JP 63290042 of NEC Engineering Corporation is to introduce an extra field, in addition to the source and destination identifiers (addresses), which would identify who should be charged; source, destination, or some third party. The problem with introducing an extra field is that in most cases it would not be compatible with the existing protocols already in widespread use.

SUMMARY OF THE INVENTION

According to the invention there is provided a communication network comprising at least two user access points, a communication medium through which communications between user access points pass and a communication monitoring point in the medium, wherein each user may be allocated a plurality of user identifiers associated with respective predetermined charging schemes, the network being arranged to accept communications including user identifiers in each of a destination identifier field and a source identifier field and wherein the communication monitoring point is arranged to monitor user identifiers in a communication to determine the charging scheme.

Accordingly, various charging schemes are embraced without the need for additional fields in the communications.

Hence, embodiments of the present invention provide an arrangement which overcomes or avoids at least to some extent, one or more problems associated with prior art.

For instance, embodiments of the invention provide an arrangement allowing each item of traffic co be allocated and charged to a predetermined party Further, embodiments of the invention provide an arrangement to allow each item of traffic to be charged to the correct party without the need for introducing extra fields into the existing protocol.

The identifiers may comprise originator identifiers or recipient identifiers, respective charging schemes being associated with each recipient identifier. Where a communication includes an originator identifier and a recipient identifier the associated charging schemes may comprise: all charges to user associated with originator identifier, all charges to user associated with recipient identifier, all charges to user associated with originator identifier at a premium rate, a proportion of the revenue proceeding to user associated with recipient identifier; charges shared between user associated with originator identifier and user associated with recipient identifier; predetermined standard rate charges to user associated with originator identifier, additional charges to user associated with recipient identifier—where, for example, the predetermined standard rate is a local rate; and/or all charges to a predetermined third party. Where a communication includes two originator identifiers or two recipient identifiers, the charging scheme may comprise all charges to user associated with identifier in source identifier field. The network may include a data storage area in which, against each originator identifier, are stored allowed recipient identifiers for communications designating that originator identifier. The potential for fraud is thus reduced.

The network may include a data storage area for storage of user information, allocated user identifier, and associated charging scheme.

The network may be arranged to operate in conformance with the ISO communications protocol, In which communications are passed at ISO layer 3.

A multi-network communication system may be provided comprising a plurality of communication networks as herein described, and in which user identifiers may be network specific. In that case, a simplified charging system between networks is achieved, as the originating network can easily be identified The identifiers may comprise originator and recipient identifiers, and charges may be directed towards the network associated with the originator identifier.

According to the invention a charge allocation system is provided for a communication network as described herein comprising a communication monitoring point and a charge allocation sub-system, the network being arranged to accept communications including one of a plurality of user identifiers associated with respective predetermined charging schemes in each of a source identifier field and a destination identifier field, and the charge allocation sub-system storing user information, associated user identifiers, and respective corresponding charging schemes, wherein the communication monitoring point is arranged to monitor identifiers in the destination and/or source identifier fields of a communication and transfer the identifier information to the charge allocating sub-system to determine the charging scheme.

According to the invention there is further provided a method of allocating charges in a communication network for a plurality of users in which one or more users is assigned a plurality of user identifiers each associated with a respective predetermined charging scheme, communications in the network include destination identifier and source identifier fields in which the user identifiers are held, and a communication monitoring point monitors the user identifiers to establish an appropriate charging scheme.

BRIEF DESCRIPTION OF THE DRAWINGS

Embodiments of the invention will now be described, by way of example, with reference to the drawings of which.

DETAILED DESCRIPTION OF EXEMPLARY EMBODIMENTS

The present invention addresses the problems identified above by allowing the allocation of different, multiple identifiers to customers according to their mode of use in a network, the identifiers being incorporated within the packet-types allowed under existing protocols, without the need for the addition of fields.

One such protocol, which will be discussed in conjunction with the specific embodiment addressed herein, but to which the invention is not of course limited, is the ISO protocol. The protocol comprises a stack of various layers and it is proposed to operate the system at ISO layer 3; the network layer. The benefits of this approach are discussed in more detail below, but it should be noted that it allows multiple identifiers to be allocated to customers, as required under the present invention.

Figures 3, 4:
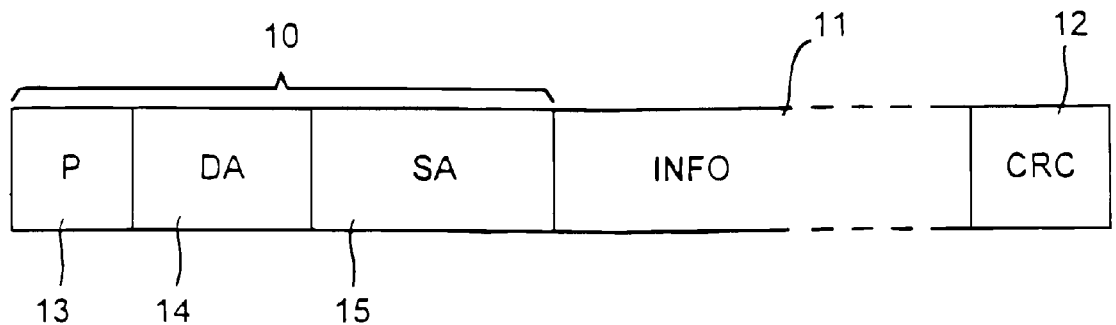
FIG. 3 shows a typical message packet format.
FIG. 4 is a representation of a charging table according to the present invention.

Under the protocol, communications between terminals accessing a network are sent in the form or packets and a simplified packet format is shown in FIG. 3. The packet is divided into various fields including a header shown generally as 10 containing administration information about the nature of the sacket, an information field 11 containing the actual message communicated in the packet and a check field 12 for detecting errors in the packet under, for example, a cyclic redundancy check code (CRC). Turning to the header 10 in more detail, it comprises a preamble (P) 13, a destination address or identifier field (DA) 14 and a source address or identifier field (SA) 15.

The destination identifier (DA) 14 indicates where the message is being sent to and the source identifier (SA) 15 indicates where the message is being sent from.

In order to embrace various different charging schemes—such as sender pays, receiver pays, third party pays or other variants discussed below, multiple identifiers are allocated to customers which can be entered in the destination or source identifier fields (DA,SA) 14,15. Two principal types of customer identifiers are provided signifying the following usage modes:

1. Originator identifiers. An originator identifier indicates that the corresponding customer originated the call and will accept the call charging scheme as determined by the recipient identifier.
2. Recipient identifers. A recipient identifier indicates that the corresponding customer received the call and would also determine how the call charges should be allocated.

In this context a call is taken to be a related sequence of exchanges between two or more parties.

Every customer is allocated at least one recipient identifer which could be considered the customer's normal identifier and can be compared in some ways to a PSTN (public switched telephony network) telephone number, i.e. this is the identifer (number) used co contact the corresponding customer.

Each recipient identifier is allocated and registered by the network operator who also associates a charging scheme with that recipient identifer. The default charging scheme may be that the call originator (identified by an originator identifier) should nay the call costs. Other charging schemes comprising special trafficking schemes can also be applied including: the recipient paying for the call; the originator paying a premium rate with part of the call revenue going to the recipient; the originator and recipient sharing the charges in some way; or the originator paying the equivalent of the "local rate" and the recipient payment the balance. As a further alternative charges can be allocated to a third party. It will be seen that any general scheme whereby charges are allocated to one or more of the originator, the recipient and a third party may be adopted.

Customers may have more than one recipient identifer with each identifier associated with a different charging scheme.

Referring to FIG. 4 charging information can be maintained by the network operator in a suitable charging table in which an entry is kept against each allocated recipient identifer indicating the charging scheme associated with the recipient identifier. For example a first unique recipient identifier $RID_1$ is allocated to recipient $R_A$ and designates that the originator of the call be charged. Recipient identifer $RID_2$ is also allocated to recipient $R_A$ and designates that recipient $R_A$ should be charged. Recipient identifer $RID_3$ is also allocated to $R_A$ and indicates that the call originator should be charged, for example at a premium rate, a part of the call revenue going to recipient $R_A$. Recipient identifier $RID_4$ is also allocated to recipient $R_A$ and designates that the charge should be shared between the call originator and recipient $R_A$, for example with each party paying one half of the charge.

Figure 5:
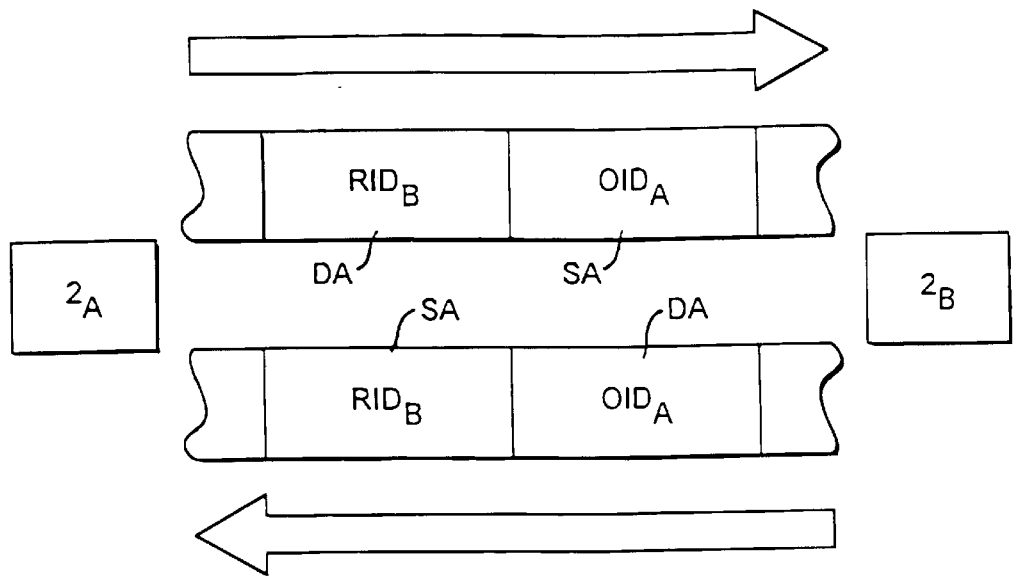
FIG. 5 shows, schematically, message packets exchanged according to the present invention.

The system would then be implemented as follows:

For two-party calls the call originator would be identified by an originator identifier while the call recipient would be identified by one of their recipient identifiers. These identifiers would appear as the source or destination identifiers depending on the direction of flow of each packet comprising the exchange between the call originator and recipient. This is illustrated in FIG. 5. An originator (first customer) using terminal $2_A$ calls a recipient (second customer) at terminal $2_B$. The call from the originator has the first customer's originator identifier $OID_A$ as the source identifier (SA) and the second customer's recipient identifier $RID_B$ as the destination identifier (DA). In the return message from the second customer at terminal $2_B$ the source identifier (SA) is the second customers's recipient identifier $RID_B$ and the destination identifier (DA) is the first customer's originator identifier $OID_A$.

The call charges are then allocated according to the charging scheme associated with the recipient identifier $RID_B$, as will be discussed in more detail below. For example, the charges for all packets flowing in both directions between the originator and the recipient may be allocated to the originator.

Figure 1:
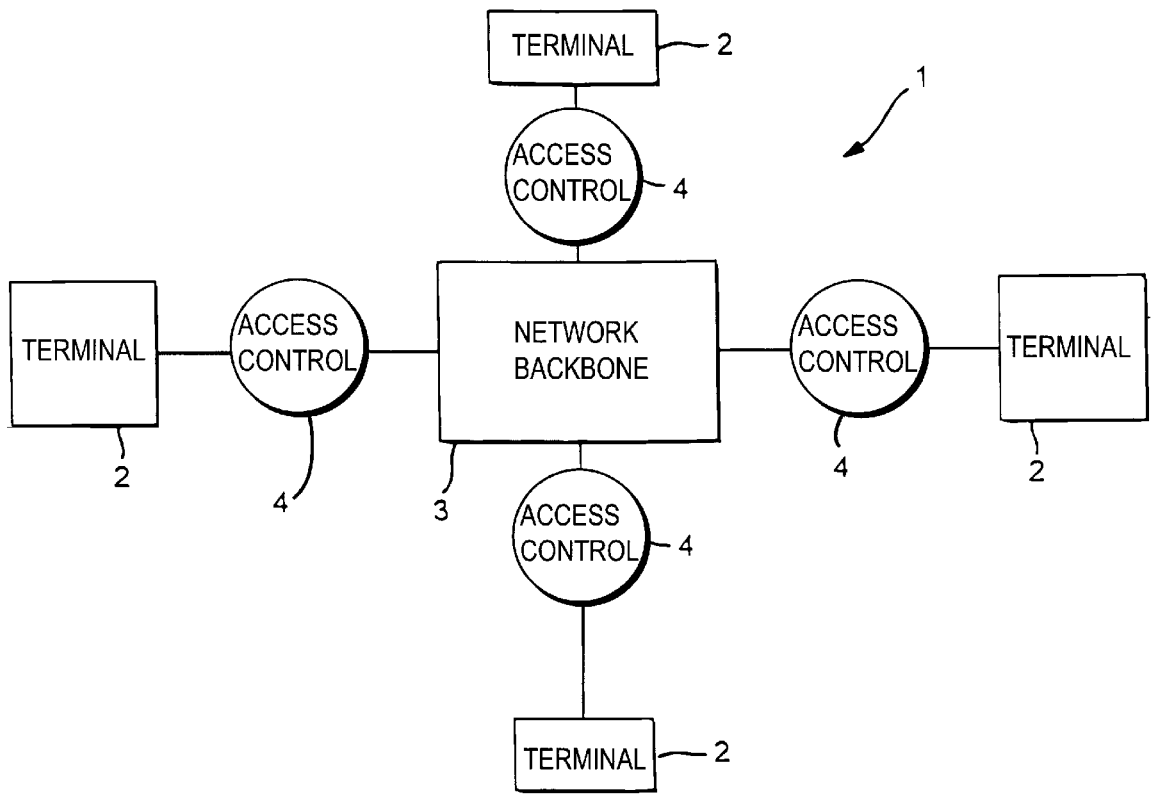
FIG. 1 is a schematic illustration of a prior art network including access control.
Figure 2:
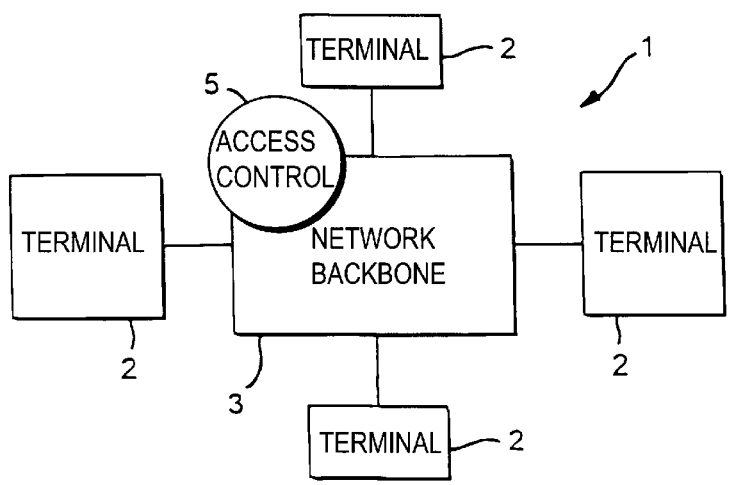
FIG. 2 is a schematic illustration of a prior art network including a network usage monitor at a single point within the network domain.
Figure 6:
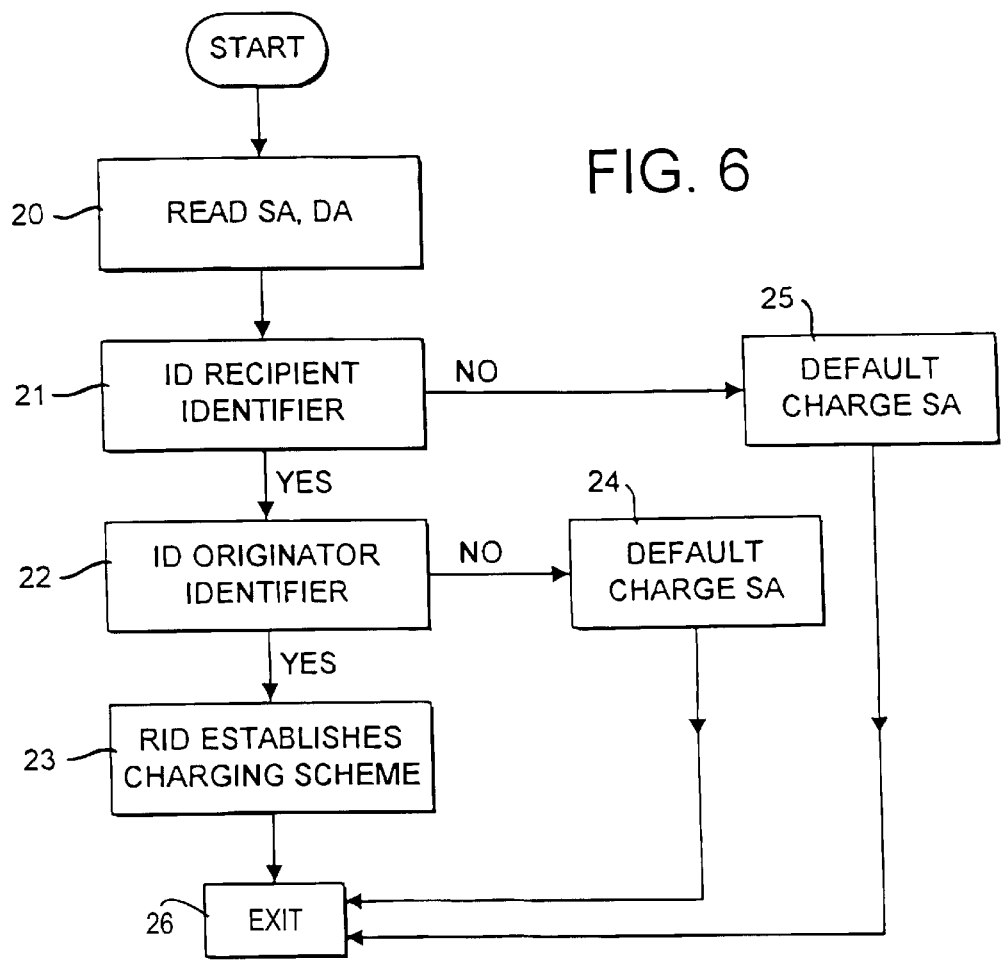
FIG. 6 is a flow chart illustrating charge allocation according to the present invention.

The flow chart of FIG. 6 illustrates the system by which charges are allocated. As discussed above, all packets pass through a monitoring point 5 within a network backbone 3 as shown in FIG. 2. The source identifier and destination identifier of each packet are then read (20) and the recipient identifier is identified (21). The originator identifer is also identified (22) and the recipient identifer is compared against its charging scheme entry (FIG. 4) to establish the corresponding charging scheme (23), and, dependent on the charging scheme, will charge the call to the originator as identified by the originator identifier, or follow any other allocated charging scheme. The charges are determined on the basis of any known system, for example a fixed charge per packet, the charge based on the duration of the packet, a charge based on the distance of the call, the time of day, the packet type and so forth. The charging subroutine is then exited at 26 in readiness to be called again to read the next SA, DA.

Generally, in order to determine whether an identifier is an originator or recipient identifier the network provider which allocated the identifier consults its allocation tables and recognises the identifier type accordingly. Preferably, however, it is possible to distinguish different identifiers in terms of:

the network provider who allocated the identifier;

originator or recipient identifier;

optionally different types of recipient identifier.

With regard to recognising different types of recipient identifiers it is desired to be able to at least distinguish which party pays in terms of:

originator;

recipient; or other scheme such as premium rate, third party or shared allocation. These systems would be particularly advantageous when operating over multiple network domains.

It should be noted that customers may have one or more originator identifiers, also allocated by the network operator. In that case a Further table corresponding to that shown in FIG. 4 will contain entries indicating which charging account is associated with which originator identifer. When a recipient identifier is received indicating that the call originator as identified by an originator identifer within the same packet should be charged, the sub-account entry corresponding to the originator identifier is billed. The originator identifer would normally only be used for making calls (directed to a recipient identifier), and may optionally be allocated only for the duration of a call as is discussed in more detail below.

If desired, customers can communicate without using originator identifiers, i.e. with all parties using their recipient identifiers. This is the fallback case which matches the situation in known network arrangements with each customer normally having just one identifier which is used for all their communications. There would be no way to choose between the charging schemes associated with the two recipient identifiers and the network operator would have to use the default scheme of allocating usage charges to whichever customer is identified as the source of each packet.

Figure 7:
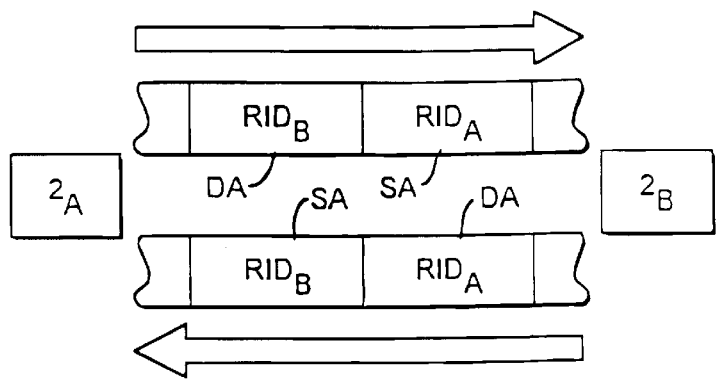
FIG. 7 shows, schematically, message packets exchanged in a different format according to the present invention.

According to that system, and as shown in FIG. 7, the packets from the first customer at terminal $2_A$ to the second customer at $2_B$ include as their source identifier (SA) the first customer's recipient identifier $RID_A$ and as the destination identifier (DA) the second customer's recipient identifier $RID_B$. The return message from terminal $2_B$ to terminal $2_A$ will have as its source identifier (SA) the second customer's recipient identifier $RID_B$ and as its destination identifier (DA) the first customer's recipient identifer $RID_A$.

The operation of this system is also shown in the flow chart of FIG. 6 wherein, if no originator identifier is identified at 22 the system moves to the default step 24 of charging whoever is identified as the source of each packet.

It is also possible that packets can be launched with originator identifiers used for both the source and destination. The. default step is shown at FIG. 6 whereby, if no recipient identifier is identified at 21 the default scheme provides for the allocation of usage charges to whichever customer is identified as the source of each packet 25.

The invention further embraces the possibility of multi-party exchanges (many to many, one to many, many to one) without using originator identifiers in the same way as for two-party exchanges (one to one) with the participants all identified by their recipient identifiers and with each participant allocated the charges for the packets they source, according to the default step 24 in FIG. 6.

Alternatively a conference organizer could be allocated a recipient identifier, with an associated charging scheme, which they would then advertise in some way.

Figure 8:
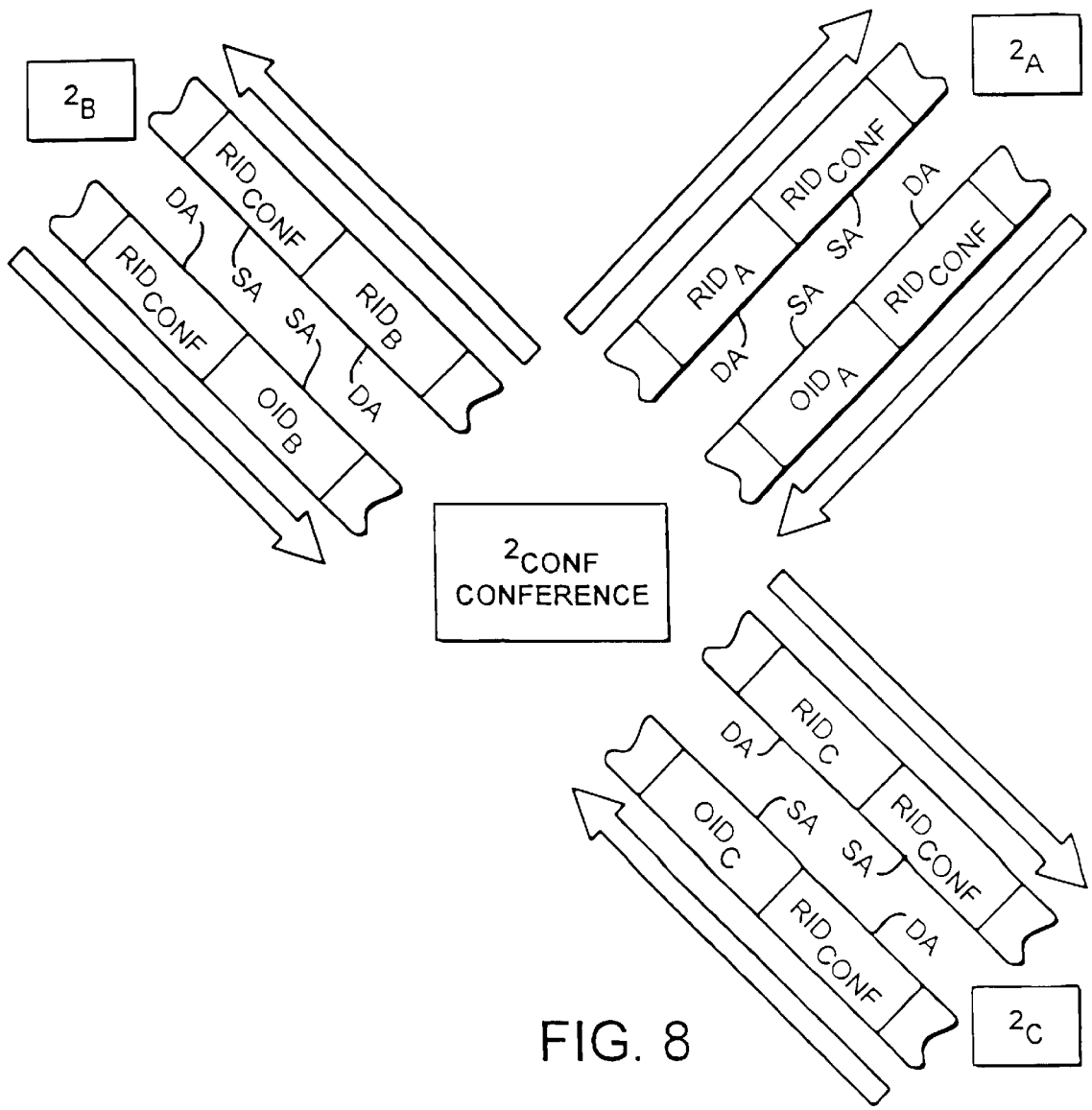
FIG. 8 shows, schematically, message packets exchanged in a multi-party conference according to the present invention.

As shown in FIG. 8 the conference organizer at a terminal $2_{CONF}$ sends potential participants at 2A,2B,2C invitations using the conference recipient identifier $RID_{CONF}$ as the source identifier (SA). Since the destination identifier (DA) on each invitation is the invite's recipient identifier $RID_{A/B/C}$, both the source and destination of the invitation message packets are recipient identifiers (the default step 24 of FIG. 6) and the network charges for these Dackets are allocated to their source, i.e. the conference organizer.

Customers wishing to participate in the conference then "dial in" and submit their contributions using their own originator identifer $OID_{A/B/C}$ as the source identifier (SA) and the conference recipient identifier $RID_{CONF}$ as the is destination identifier (DA). The contributions and responses of other participants are obtained by monitoring other traffic with the conference recipient identifer $RID_{CONF}$ as the destination. Any contributions from the conference organizer to $2_{CONF}$ would also have the conference recipient identifier $RID_{CONF}$ as the destination.

A charging scheme suitable for this form so network based conferencing is where the conference organizer accepts part or all of the network charges. Any attempt to collect premium rate network charges from participants would probably require each participant to be connected on a one to one basis to a conference bridging unit; with encryption used to prevent other network users from eavesdropping or interrupting. Such a system would allow the filtering out (shut-out) and ignoring of any one sending in contributions using their own recipient identifier (or some target customers' recipient or originator identifier) to avoid paying the premium rate charges. Security issues are discussed further below.

Figure 9:
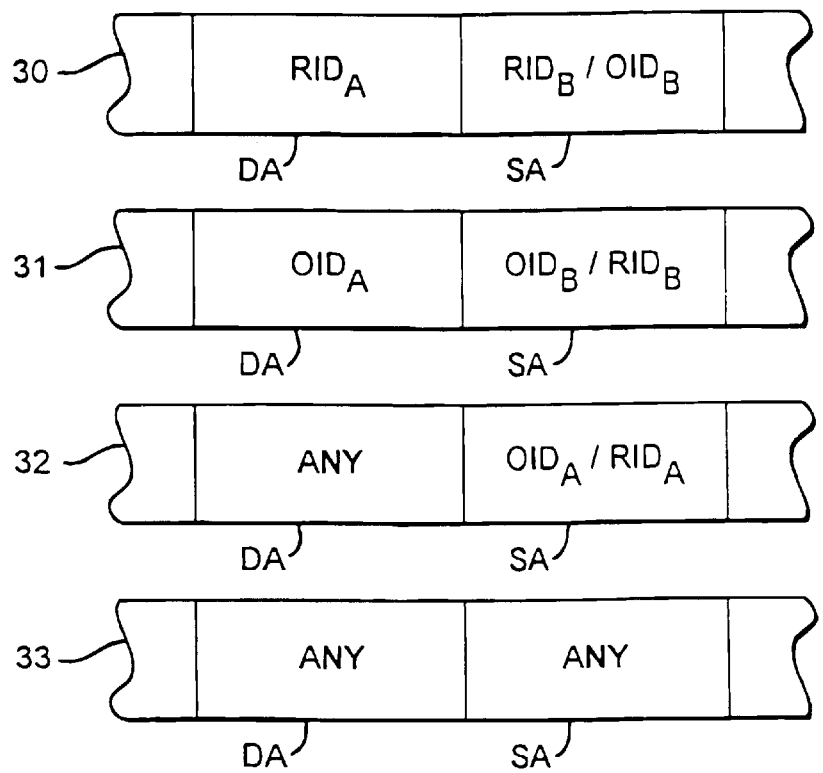
FIG. 9 shows alternative message packets.

It will be appreciated that network users may try to avoid paying network charges. In the following discussion the term "target customer" will be used to refer to the potential victim of a fraud. Two principal scenarios are considered as illustrated in FIG. 9:

1. Packets are sent to the target customer but the sender endeavours to avoid paying the full network charges which would normally be associated with the target customer's recipient identifier. This scenario has two variations:

Packets 30 are sent to the target customer using the target customer's recipient identifer $RID_A$ as destination identifier (DA).

Packets 31 are sent to the target customer using the target customer's originator identifer $OID_A$ as destination identifier (DA).

2. Packets 32 are sent, potentially to any destination, with the sender impersonating a target customer and using the target customer's originator or recipient identifer $OID_A/RID_A$ as the source identifier (SA) so that the sender can avoid paying the network charges.

Where a target customer's recipient identifier RIDA is used as the destination identifier (DA) for a packet then: either the source identifier (SA) will be another recipient identifer $RID_B$ in which case the network charges will be allocated to the source customer (i.e. the other party pays as per default step 24 in FIG. 6); or the source identifier (SA) will be an originator identifier $OID_B$ in which case the recipient identifier $RID_A$ will determine who gets charged and how (i.e. the target customer controls the charging scheme).

A potential fraudster may use a recipient identifier $RID_B$ instead of an originator identifier $OID_B$ as their source identifier (SA) when contacting a target customer in order to avoid the full call charges which the potential fraudster should incur under the charging scheme associated with the target customer's recipient identifier $RID_A$ (the destination identifier (DA)), particularly if this would charge the potential fraudster at a premium rate. This is in accordance with the default step 24 in FIG. 6. In this situation the target customer can simply decline to respond to the potential fraudster. It would be the need for this ability to shut out invalid participants which is likely to restrict the form of network based conferencing described above to those charging schemes where the conference organizer accepts part or all of the network charges.

Where the target customer's recipient identifer $RID_A$ is associated with a charging scheme which allocates the network charges to the target customer there would be the potential for malicious callers, using originator identifiers $OID_B$, to repeatedly contact the target customer tying up resources and causing the target customer to incur unwanted network charges. If a valid originator identifer $OID_B$ is used then the culprits could be traced easily by the network operator who allocated the originator identifer $OID_B$. The problems of abuse and impersonation of originator identifiers are discussed below.

Where a target customer's originator identifier $OID_A$ is used as the destination identifier (DA) for a packet 31 then: either the source identifier (SA) will be another originator identifier $OID_B$ in which case the network charges will be allocated to the source customer (i.e. the other party pays as per default step 25 in FIG. 6); or the source identifier (SA) will be a recipient identifier $RID_B$ in which case the recipient identifier will determine who gets charged and how. In the latter case the sender thus has control over how the packets 31 they have sent out will be charged.

A potential fraudster could in principle send packets 31 to a target customer using the target customer's originator identifier $OID_A$ as the destination identifier (DA) and using one of the fraudster's recipient identifers $RID_B$ as the source identifier (SA). If the fraudster uses a recipient identifier $RIB_B$ which has a charging scheme whereby premium rate charges are allocated to the (target) customer corresponding to the originator identifier $OID_A$, with part of the call revenue being passed to the (fraudster) customer corresponding to the recipient identifier $RID_B$, then the fraudster could collect money (from the network operator) simply by sending packets 31 out to target customers.

Fraudsters attempting to operate in this way could be detected by target customers checking the source identifiers (SA) of any packets 31 sent to. them using their originator identifier $OID_A$. Once detected a fraudster could be traced by the network operator who allocated their recipient identifier $RID_B$.

Alternatively the network operator could maintain a list of valid recipient identifiers RID against each originator identifier OID. Then when a customer (a caller) wished to use their originator identifier OID to contact another customer (the called party), they would first inform the network operator who would add the called party's recipient identifier RID to the list of valid recipient identifiers RID registered against the caller's originator identifer OID. The caller would then communicate with the called party in the manner described above with reference to FIG. 5. At the end of the exchange the caller would again contact the network operator who would now remove the called party's recipient identifier RID from the list of valid recipient identifiers RID registered against the caller's originator identifier OID. Customers may choose to have certain (trusted) recipient identifiers RID permanently registered. The communications with the network operator could be secured using encryption and digital signatures. Accordingly originator identifiers OID may be allocated only for the duration of a call.

Thus any packets 31 sent out with a target customer's originator identifier $OID_A$ as the destination identifier (DA) and with an invalid (unregistered) recipient identifier $RID_B$ as the source identifier would be charged to the source customer (corresponding to the recipient identifier $RID_B$) making fraud of the type described earlier considerably more difficult.

Potential fraudsters may use a target customer's recipient or originator identifiers $RID_A/OID_A$ as the source identifier (SA) for packets 32; potentially with any destination to avoid having to pay any associated network charges. Typically the fraudster may use the target customer's recipient identifier $RID_A$ (which should be readily available) as the source identifier (SA) to send packets 31 to a valid destination (identified by its recipient identifier RID) so that the target customer pays the network charges. Alternatively packets could be launched with various combinations of originator and recipient identifiers OID/RID as destination identifiers (DA), not to achieve any data transmission, but simply to waste resources and cause the corresponding customers to incur unwanted network costs. Such packets are shown in FIG. 9 referenced 33.

One way to detect such behaviour would be for each (target) customer to monitor the network for any traffic (launched elsewhere) for one of their own recipient or originator identifiers RID/OID as the source identifier (SA) Tracing the culprits would then require the network operator to track down the physical source of any such pirate traffic.

Accordingly, the potential for fraud in the system can be restricted or eliminated by various straightforward means.

As discussed above, the scheme of the present invention can be applied at ISO layer 3, the network layer. At this layer the internet protocol (IP) operates allowing multiple recipient and originator identifiers to be allocated to customers. There is currently some restriction on the number of IP identifiers available but this limitation. is being addressed by the Internet Engineering Task Force (IETF).

On the other hand, the prior art reference U.S. Pat. No. 5,406,555 discussed above uses source and destination identifiers at the ISO layer 2 (link layer) protocol; this is typically the ethernet protocol. At this level each identifier is generally associated with a particular piece of equipment (for example a computer terminal) connected to the network and it would be difficult to assign multiple recipient and originator identifiers to customers.

Figure 10:
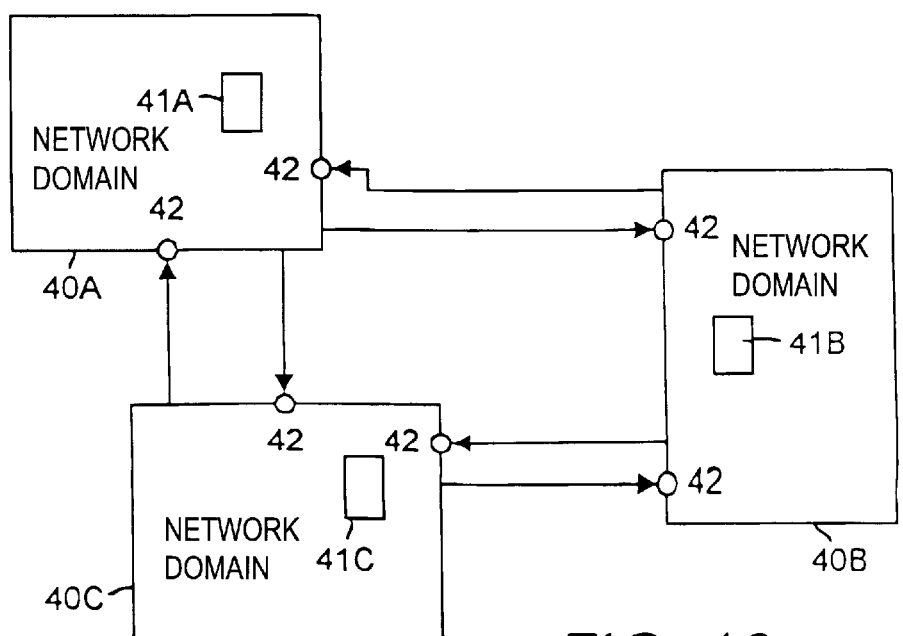
FIG. 10 shows message packet exchange between networks.

An advantage in applying the scheme described in this document at the network layer (ISO layer 3) would be that a common set of customer identifiers could be used across a multiplicity of bearer networks in the manner shown in FIG. 10, as is the case with IP addresses (identifiers). This will, however, necessitate the ability to allocate charges for packets passing into, out of, or through each network domain 40A,40B,40C.

To achieve allocation in this manner each network provider 41A,41B,41C handles a packet to pass the charges directly to the source network provider. This would be straightforward if the allocating network provider can be identified from each recipient and originator identifier, e.g. through the association of a particular range of identifiers with each network provider as is currently the case with IP addresses.

Packets with two recipient identifiers (or two originator identifiers) as the source and destination identifiers would thus be correctly allocated. On receipt of the charges for packets with one originator and one recipient identifier the (source)network provider would check whether the recipient identifier was valid for the given originator identifier (as discussed above), check the charging scheme associated with the recipient identifier, and settle up with the other party's (destination) network provider as appropriate.

If originator and recipient identifiers can be easily distinguished, and provided most packets with one originator and one recipient identifier end up being charged to the customer corresponding to the originator identifier, then the above process could be made more efficient by directing the charges for such packets towards the originator's network provider (which may or may not be the source network provider).

By allocating charges to network providers using the simple rules described above the network monitors and charge raising systems would not be required to store (and maintain) large quantities of customer identifier and charging scheme data for customers outside their local network, and could be dimensioned to optimise the trade off between storing unprocessed charge records and the costs of communicating with other network providers to present packet charge records, check the applicable charging schemes and settle up their accounts.

Another opportunity for fraud in a multi-network scheme occurs because a target customer can only monitor their local network for pirate packets sourced by fraudsters impersonating that target customer. Such pirate traffic on other networks would not be detected, but the charges would still come back to the target customer. This could be addressed by the target customer's network provider monitoring charges arriving from other domains to ensure that those charges correspond to valid traffic patterns. For example the provider could check that, where packet charges are received from some distant domain, corresponding charges are also received from intermediate networks along a valid route.

By virtue of the association to different identifiers with network users for allocating usage charges, the system allows the allocation of network charges based on customer usage wherein low users do not have to subsidise high users as would be the case under a flat rate subscription charging regime. The system is thus far more attractive to smaller customers wishing to make use of the network. In addition, the various exchanges in an interactive call sequence can be collated and charged to any desired party involved in the call without the need to define additional fields and transmission protocols employed.

Whilst the invention has been discussed above in relation to a standard network such as a local area network, it will be appreciated that it can be applied to other network systems, with or without access controls, but wherein all messages must pass through a single, or a small number of points relative to the number of available access points. It will further be appreciated that any number of originator and recipient identifiers may be allocated dependent only upon limitations of the system protocol, allowing a desired charging scheme to be adopted. For example a recipient identifier may indicate that all charges are to be made to an identified third party.

What is claimed is:

1. A communication network comprising:
   at least two user access points,
   a communication medium through which communications between user access points pass, and
   a communication monitoring point in the medium,
   wherein each user may be allocated a plurality of user identifiers associated with respective predetermined charging schemes,
   the network being arranged to accept communications including user identifiers in each of a destination identifier field and a source identifier field, and
   wherein the communication monitoring point is arranged to monitor user identifiers in a communication to determine the charging scheme.

2. A communication network as in claim 1 including:
   a data storage area for storage of user information, allocated user identifier, and associated charging scheme.

3. A communication network as in claim 1 arranged to operate in conformance with the ISO communications protocol, and in which communications are passed at ISO layer 3.

4. A communication network as in claim 1 including a charge allocation system comprising:
   a communication monitoring point and a charge allocation sub-system,
   the network being arranged to accept communications including one of a plurality of user identifiers associated with respective predetermined charging schemes in each of a source identifier field and a destination identifier field, and
   the charge allocation sub-system storing user information, associated user identifiers, and respective corresponding charging schemes,
   wherein the communication monitoring point is arranged to monitor identifiers in at least one of the destination and source identifier fields of a communication and to transfer the identifier information to the charge allocating sub-system to determine the charging scheme.

5. A communication network as in claim 1 wherein the communications network comprises a plurality of said communication networks.

6. A communications network as in claim 1 wherein the communications network comprises a plurality of said communication networks.

7. A network as in claim 6 wherein user identifiers are network specific.

8. The network as in claim 6 wherein the identifiers comprise originator and recipient identifiers, and charges are directed towards the network associated with the originator identifier.

9. The network as in claim 7 wherein: the identifiers comprise originator and recipient identifiers, and charges are directed towards the network associated with the recipient identifier.

10. A communication network as in claim 1 wherein the identifiers comprise originator identifiers or recipient identifiers, respective charging schemes being associated with each recipient identifier.

11. A communication network as in claim 10 including a data storage area wherein, against each originator identifier, are stored allowed recipient identifiers for communications designating that originator identifier.

12. A communication network as in claim 10 including:
    a data storage area for storage of user information, allocated user identifier, and associated charging scheme.

13. A communication network as in claim 10 arranged to operate in conformance with the ISO communications protocol, and in which communications are passed at ISO layer 3.

14. A communication network as in claim 10 wherein:
    where a communication includes two originator identifiers or two recipient identifiers, the charging scheme comprises all charges to user associated with identifier in source identifier field.

15. A communication network as in claim 14 including a data storage area wherein, against each originator identifier, are stored allowed recipient identifiers for communications designating that originator identifier.

16. A communication network as in claim 10 wherein:
    where a communication includes an originator identifier and a recipient identifier, the associated charging schemes comprise at least one of (a): all charges to user associated with originator identifier, (b) all charges to user associated with recipient identifier, (c) all charges to user associated with originator identifier at a premium rate, (d) a proportion of the revenue proceeding to user associated with recipient identifier; (e) charges shared between user associated with originator identifier and user associated with recipient identifier; (f) predetermined standard rate charges to user associated with originator identifier, additional charges to user associated with recipient identifier; and (g) all charges to predetermined third party.

17. A communication network as in claim 16 including a data storage area wherein, against each originator identifier, are stored allowed recipient identifiers for communications designating that originator identifier.

18. A communication network as in claim 16 including:
    a data storage area for storage of user information, allocated user identifier, and associated charging scheme.

19. A communication network as in claim 16 arranged to operate in conformance with the ISO communications protocol, and in which communications are passed at ISO layer 3.

20. A method of allocating charges in a communication network for a plurality of users, said method comprising:
    assigning a plurality of user identifiers to each of plural users each user identifier being associated with a respective predetermined charging scheme,
    including destination identifier and source identifier fields in network communications in which fields the user identifiers are held, and
    monitoring the user identifiers at a communication monitoring point to establish an appropriate charging scheme.

* * * * *